United States Patent [19]

Honda et al.

[11] Patent Number: 4,641,944
[45] Date of Patent: Feb. 10, 1987

[54] IMAGE EXPOSING APPARATUS

[75] Inventors: Haruhisa Honda; Hiroaki Tsuchiya, both of Yokohama; Michitaka Setani, Kawasaki; Mitsuhiro Tokuhara, Amagasaki, all of Japan

[73] Assignee: Canon Kabushiki Kaisha, Tokyo, Japan

[21] Appl. No.: 745,211

[22] Filed: Jun. 17, 1985

[30] Foreign Application Priority Data

Jun. 21, 1984 [JP] Japan .................................. 59-128363
Nov. 9, 1984 [JP] Japan .................................. 59-235216
Nov. 9, 1984 [JP] Japan .................................. 59-235217

[51] Int. Cl.4 ........................................... G03B 27/00
[52] U.S. Cl. ......................................... 355/1; 355/71
[58] Field of Search ........................... 355/1, 71, 46, 8

[56] References Cited

U.S. PATENT DOCUMENTS 3,788,740 1/1974 Shogren .............................. 355/8 X

FOREIGN PATENT DOCUMENTS 1041341 10/1978 Canada .................................. 355/1

Primary Examiner—Richard A. Wintercorn
Attorney, Agent, or Firm—Fitzpatrick, Cella, Harper & Scinto

[57] ABSTRACT

An image exposing apparatus comprises a focusing optical system for focusing an image onto a photosensitive member and having a one-line array of a plurality of focusing light transmission media, and light intensity distribution correction means arranged in a light path for forming the image for eliminating an ununiformity of light intensity on the photosensitive member due to the focusing optical system.

7 Claims, 20 Drawing Figures

IMAGE EXPOSING APPARATUS

BACKGROUND OF THE INVENTION

The present invention relates to an image exposing apparatus which focuses and exposes an image onto a photosensitive member through a converging optical system having a plurality of focusing light transmission media arranged in a line.

A converging light transmission medium known by the tradename Selfocs of Nippon Sheet Glass is an elongated cylindrical optical element whose coefficient of refraction parabolically changes in radial direction around a center axis. It is cut to an appropriate length to impart a focusing function. An array having a number of such light transmission media is applied to an electrophotographic copying machine or a document reader using an image sensor, as an optical system for exposing a document image.

In FIG. 1, light transmission media 1 described above are arranged in a line and molded in a support 2 of resin. The light intensity distribution of an image on a photosensitive member effected by such an array is the sum of the light intensity distributions of images formed by individual light transmission media, as shown by a curve E in FIG. 2. As shown, the light intensity distribution is highest at an area corresponding to the center of each light transmission medium and lowest at an area corresponding to the boundary of adjacent light transmission media. The distribution is rippled and the distribution period thereof corresponds to an arrangement period of the light transmission media. Because of the rippled light intensity distribution, an formed image includes a periodic stripe pattern. In the past, two layers of such light transmission media are stacked in a zig-zag fashion. This requires double expensive light transmission media and increases its size.

SUMMARY OF THE INVENTION

It is an object of the present invention to provide an image exposing apparatus having light transmission media arranged in a line with a rippled light intensity districution reduced to an extent that the difference between peaks and valleys of the ripple does not remarkably appear on an image.

It is aother object of the present invention to provide an image exposing apparatus which can compensate ununiformity of illumination by a light source.

DETAILED DESCRIPTION OF THE PREFERRED EMBODIMENTS

Figure 1:
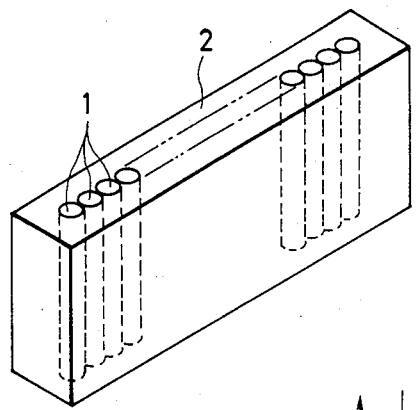
FIG. 1 is a perspective view of an array of converging light transmission media arranged in a line.
Figure 2:
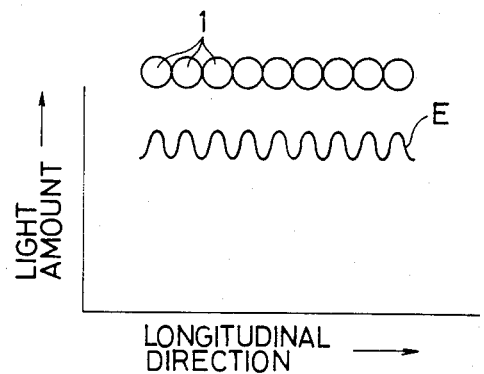
FIG. 2 shows non-uniformity of light intensity effected by the array of converging light transmission media.
Figure 3:
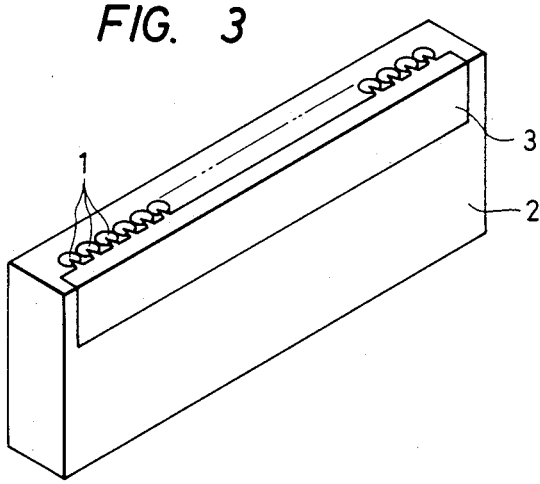
FIGS. 3 and 4 show one embodiment of an image exposing apparatus of the present invention.
Figure 4:
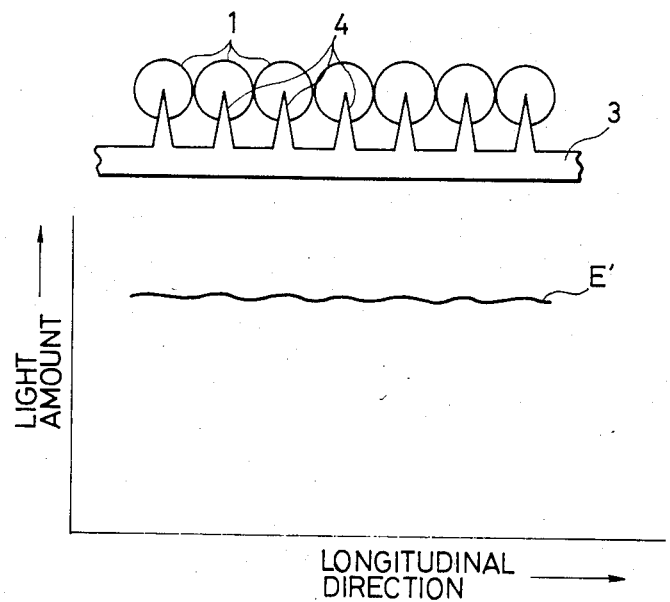

FIG. 3 shows an embodiment of the focusing optical system used in an image exposing apparatus of the present invention. An opaque light intensity distribution correction member 3 is mounted on a converging light transmission member 1. The member 3 has a number of light interruption projections 4 as shown in FIG. 4 and each projection 4 partially covers a corresponding light transmission medium 1. The projections 4 are arranged at the same pitch as a pitch of arrangement of the light transmission medium 1. Each projection 4 covers a center area of the light transmission medium 1 to lower a peak in a ripple of a light intensity distribution. The term center area of the light transmission medium is used not only to indicate a geographical center of an incident end plane or an exist end plane (which is circular) of the light transmission medium but also to indicate a line which passes through the geographical center of the above end plate (center of circle) and is normal to a direction of arrangement of the light transmission media.

In any case, of the use of the light intensity distribution member 3, an image light intensity distribution on a photosensitive plane is substantially unified or a difference between a peak and a valley of the ripple is reduced to an extent that no non-uniformity in a density of image is observed. In a copying machine, a stripe pattern is not observed in the image if a light intensity non-uniformity $\Delta I$ is less than 1.5%. The light intensity non-uniformity $\Delta I$ is defined by $$\Delta I = (I \max - I \min)/I \max$$

where I max is a maximum light intensity and I min is a minimum light intensity.

The member 3 is made of plastic film such as polyester or polypropylene or metal, which is colored or painted black to prevent light transmission therethrough. It is bonded to the array by adhesive material.

Figure 5:
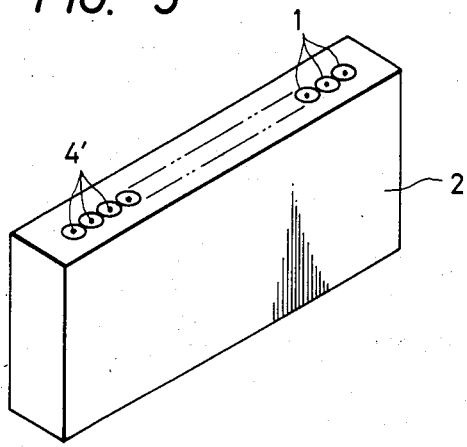
FIG. 5 shows one embodiment of a copying machine which uses the image exposing apparatus of the present invention.

FIG. 5 shows another embodiment of the focusing optical system applied to the present apparatus. Ink, Chinese ink or paint is applied in spot form at a center of each converging light transmission medium 1 to form a light blocking area 4' so that the same effect as that in the previous embodiment is obtained.

In the above embodiment, the light blocking area may be at a light incident plane of the array and/or a light exit plane. The light blocking area may be formed by a printing technique and may have a perfect light blocking property or may have a light attenuating filter function.

Figure 6:
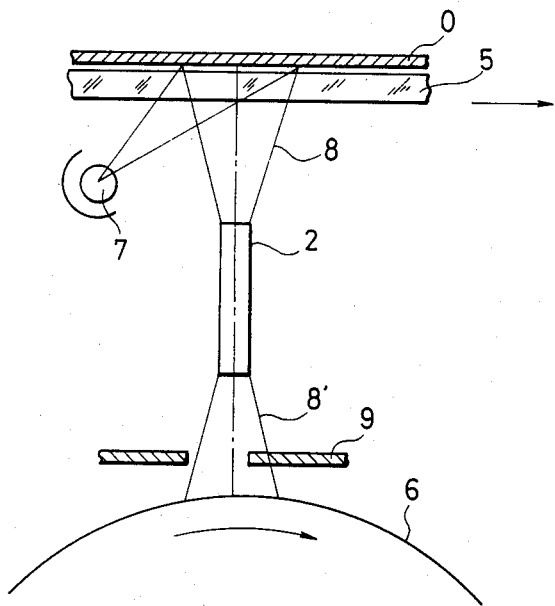
FIGS. 6 and 7 show a further embodiment of the image exposing apparatus of the present invention.

The array 2 described above may be applied to an electrophotographic copying machine as shown in FIG. 6. A document sheet 0 is mounted on a document table 5 which is moved in a direction of an arrow for scanning the document. An image of the document illuminated by a lamp 7 is focused and exposed by the array 2 onto an electrophotographic photosensitive material 6 which is rotated in the direction of the arrow.

Figure 7:
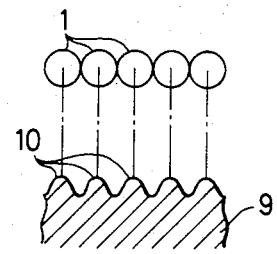

In the above embodiment, the light blocking area contacts the end plane of the light transmission medium. Alternatively, as shown by numeral 9 in FIG. 6, a light intensity distribution correction plate having light blocking areas each corresponding to each of the light transmission media may be arranged in an image forming light flux path 8' facing an image space or in an image forming light flux path 8 facing an object space, spaced from the array 2. A positional relation between the light transmission media 1 and projecting light blocking areas 10 of the light intensity distribution correction plate 9 is shown in FIG. 7. Each of the light blocking areas 10 blocks a portion of light flux which passes through the center of the light transmission medium 1 or would pass through the center thereof if the light blocking area 10 were not provided.

In the above embodiment, each of the light blocking areas has a shape analogous to the shape of the light transmission medium. A different embodiment is now explained. First, a relationship between a degree M of overlapping of light fluxes from the light transmission medium on the photosensitive member and a non-uniformity ΔI of light intensity is explained. The degree M of overlapping is expressed by an effective diameter D of the light transmission medium 1 and a radius Xo of a view field on the photosensitive member as follows.

$M = Xo/D$

Figure 8:
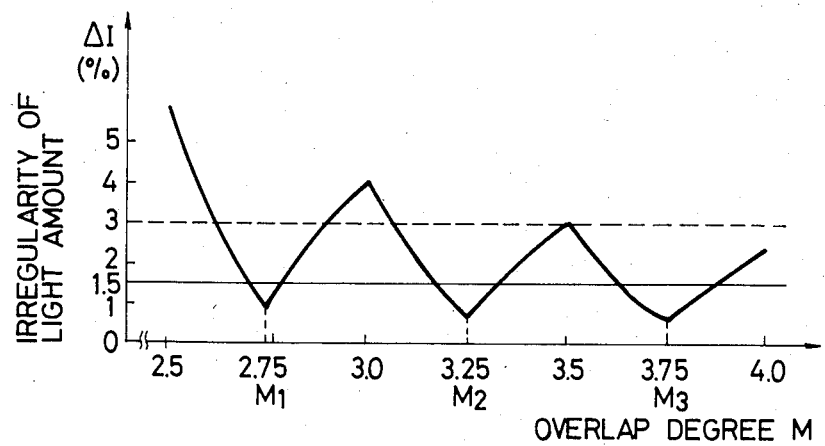
FIG. 8 shows a relation between a degree M of overlapping of images of a focusing optical system constructed by the line of converging light transmission media and the non-uniformity $\Delta I$ of light intensity.

FIG. 8 shows the relationship between the degree M of overlapping on the photosensitive member and the non-uniformity ΔI of the light intensity. As seen from FIG. 8, the uniformity ΔI of the light intensity is low when $M=2.75+0.5\chi$ (when $\chi$ is an integer no smaller than zero), that is, $M_1=2.75$, $M_2=3.25$, $M_3=3.75$, ... It has been provided, as described above, that a stripe pattern of non-uniformity does not appear in the image when the non-uniformity ΔI of the light intensity is less than 1.5%. Accordingly, if the dogree M of overlapping is set to one of the above values, the stripe pattern does not appear, but it is preferably set to $M_1$ or $M_2$ because the resolution power is lowered as the degree M of overlapping increases. However, the degree M of overlapping actually varies because of manufacturing error even if the degree M of overlapping is set to $M_1$ or $M_2$, assuming that a distance between the document plane and the focusing plane is constant. For example, in a line of array having $M=M_2$, the non-uniformity ΔI of the light intensity is 4% at maximum if the degree M of overlapping includes a variance of 0.25. If such non-uniformity ΔI of light intensity exists, a stripe pattern appears in the image of the copying machine and such a copying machine is not practically acceptable.

Figure 9:
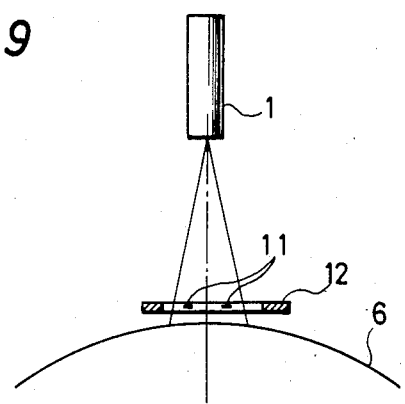
FIGS. 9, 10, 11, 12 and 13 show other embodiment of the image exposing apparatus of the present invention.
Figure 10:
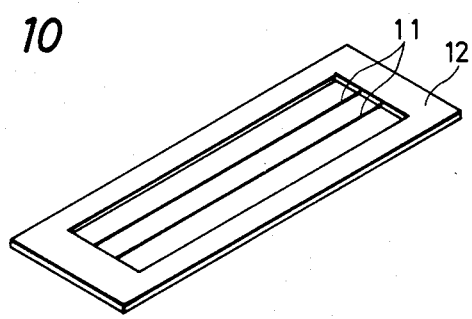
Figure 11:
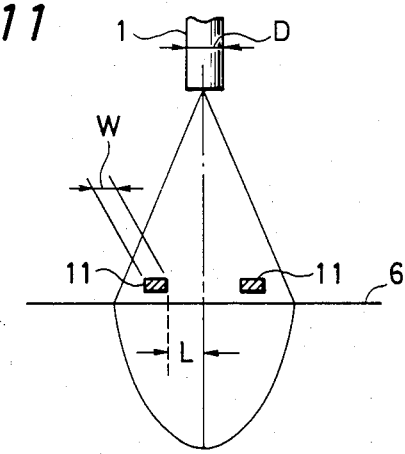

FIG. 9 shows another embodiment of the focusing optical system used in the present apparatus, and FIG. 10 is a perspective view of a linear mask used as the light blocking means. In FIG. 9, the linear mask 11 having two lines is supported by a support frame 12 in a vicinity of the photosensitive material 6 and arranged symmetrically with respect to a center line of a light path. Accordingly, a portion of light transmitted through the converging light transmission media 1 arranged in a line is blocked by the two lines of the linear mask 11. An advantage of the present embodiment is explained below. In FIG. 11, D is an effective diameter of each of the light transmission media 4, W is a width of the linear mask 11 and L is a distance between the center line of the light path and the linear mask 11.

Figure 12:
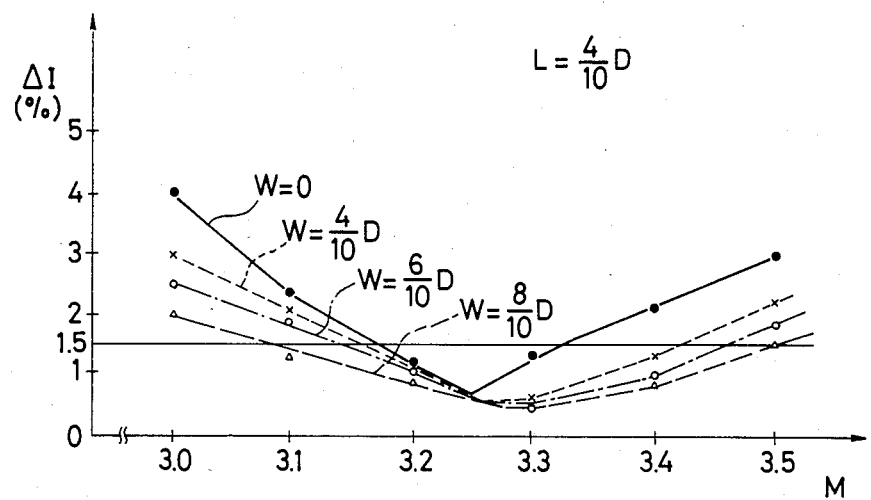
Figure 13:
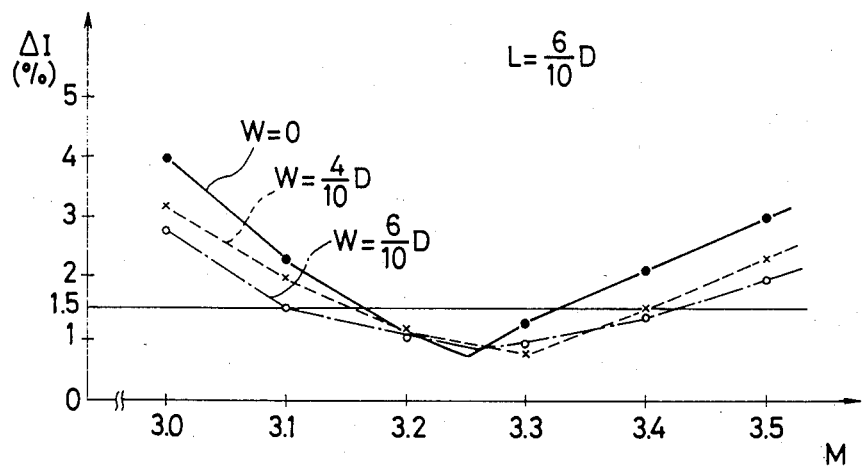

FIGS. 12 and 13 show relationships between the variation of the degree M of overlapping and the non-uniformity ΔI of the light intensity when M is set to $M_2=3.25$, with W being a parameter. FIG. 12 shows the relationship when $L=4D/10$, and FIG. 13 shows the relationship when $L=6D/10$. From FIGS. 12 and 13, allowable ranges for the variation of the degree M of overlapping are extracted, and they are shown below.

TABLE 1

|  | L = 4D/10 | L = 6D/10 |
|---|---|---|
| W = 0 | 0.16 | 0.16 |
| W = 4D/10 | 0.27 | 0.25 |
| W = 6D/10 | 0.31 | 0.32 |
| W = 8D/10 | 0.43 | — |

As seen from Table 1, the non-uniformity ΔI of the light intensity can be sufficiently reduced by properly selecting the width W of the linear mask 11 and the arrangement (i.e. the distance L). In the present embodiment, the allowable range of variance of the degree M of overlapping can be widened more than duble to compare with that without the linear mask 6 (W=0).

Figure 14:
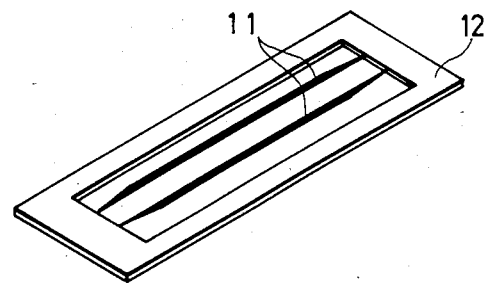
FIGS. 14, 15A, 15B and 16 show other embodiment of the image exposing apparatus of the present invention.

When the non-uniformity of the light intensity is to be corrected by using the linear light blocking means the width of the linear light blocking means may be substantially constant if an object whose image is formed on the photosensitive member by the focusing optical system is illuminated with a uniform light intensity. However, if the object is illuminated with an non-uniform light intensity, the linear light blocking means may have a function to correct the uniformity of the illuminating light intensity. This may be attained by varying the width of the linear mask along its length. One embodiment of such a linear mask is shown in FIG. 14. The linear mask 11' shown in FIG. 14 has a larger width at a center of its length and a smaller width at ends thereof. The shape of the linear mask 11' is explained in detail with reference to FIG. 15.

Figure 15A:
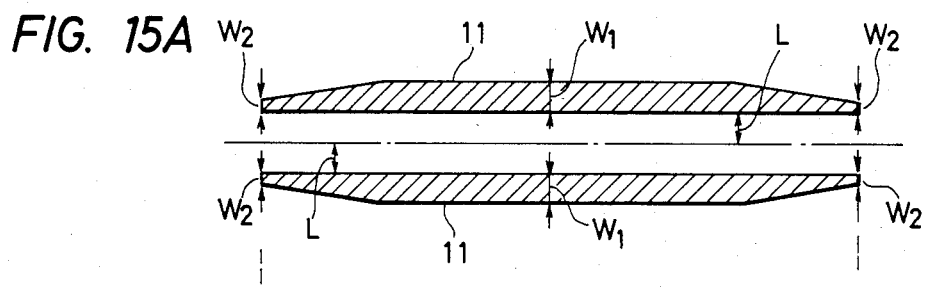
Figure 15B:
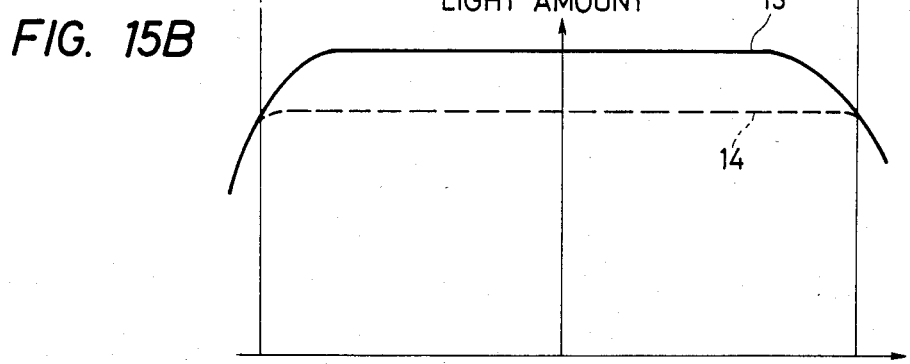

FIG. 15(A) is a plan view of the linear mask in the present embodiment, and FIG. 15(B) is a graph showing a light intensity distribution of a light source and a light intensity distribution after transmission through the linear mask.

If a light flux from the light source has a light intensity distribution on an object plane shown by a curve 13, the light intensity at a center area of the linear mask 11 can be suppressed by selecting a width $W_1$ at the center area wider and a width $W_2$ at ends narrower so that the light intensity (exposure amount) on a focusing plane of the photoconductor member can be unified as shown by a curve 14.

Figure 16:
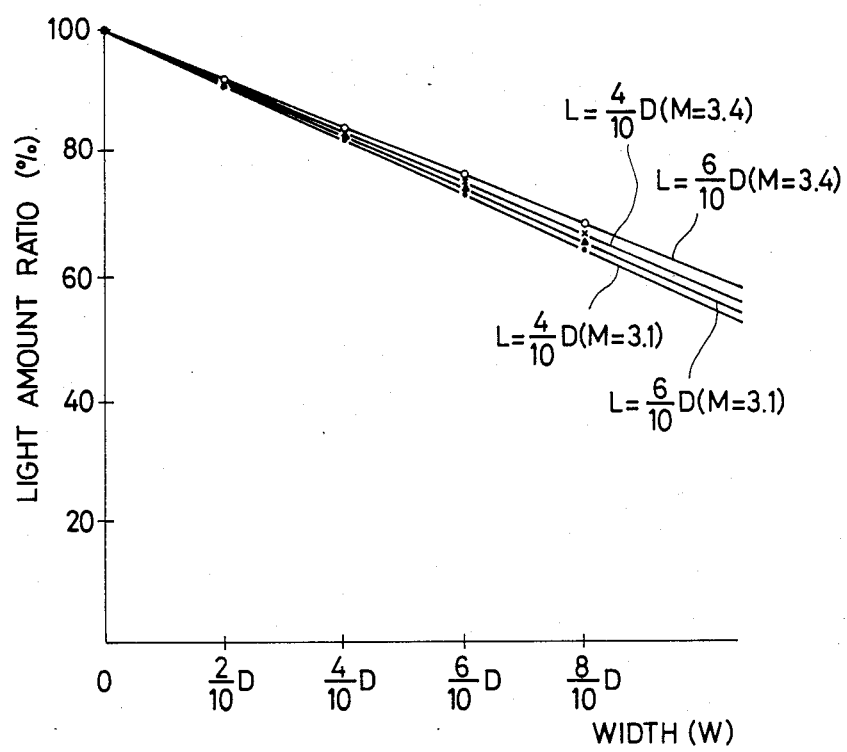

FIG. 16 shows a graph which illustrates a relationship between the width W of the linear mask 11 and the exposure amount, where P is the effective diameter of each medium of the one-line array 4 shown in FIG. 11 and L is the distance between the center line of the light path and the linear mask 11, and an ordinate represents a ratio of the light intensity of the light source to the exposure amount.

As seen from FIG. 16, the exposure amount essentially depends on the width W and decreases by approximately 10% for each increase of 2D/10 of the width W. Accordingly, the distribution of the exposure amount can be unified as shown by the curve 14 in FIG. 15(B) by setting the arrangement and the shape of the linear mask 11 such that $L=4D/10$, $W_1=8D/10$ and $W_2=4D/10$. The non-uniformity ΔI of the light intensity on the photosensitive member is corrected by the linear mask 11 as seen from Table 1 and FIG. 12.

In this manner, the width of the linear mask 11 can be varied along the length within a range to correct the non-uniformity of the light intensity on the photosensitive member in order to correct the non-uniformity of the light intensity distribution due to the light source or other causes.

The shape and the arrangement of the linear mask may take various modifications.

In FIG. 15, a two-line linear mask 15 is arranged to face the document table 5. In this embodiment, it is desirable to incline the linear mask 15 toward the light source 7 to reduce a loss of the illumination light. Thus, the allowable range of the variation of the degree M of overlapping can be widened and the non-uniformity $\Delta I$ of the light intensity can be sufficiently reduced even if the linear mask 15 is arranged in the vicinity of the object plane (i.e. document plane).

Figure 18:
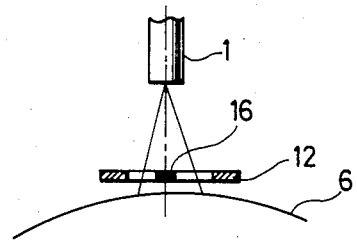

FIG. 18 shows a further embodiment of the present invention. In this embodiment, a one-line linear mask 16 is fixed on a support frame 12 and arranged on the center line of the light path in the vicinity of the focusing plane of the photosensitive drum 6. The allowable range of the variation of the degree M of overlapping can be widened by properly selecting the width W of the linear mask 16.

Figure 17:
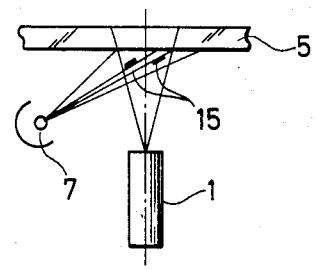
FIGS. 17, 18 and 19 show further embodiments of the image exposing apparatus of the present invention.
Figure 19:
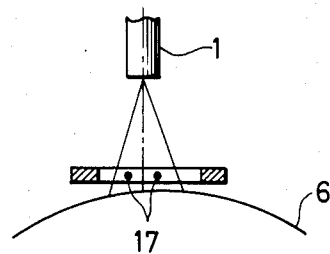

FIG. 19 shows yet another embodiment of the present invention. In this embodiment, the sectional shape of the linear mask 17 is circular. In the linear masks 17 shown in FIGS. 17 to 19, the non-uniformity of the light intensity due to the illumination light source can be corrected by changing the width along the length.

In the light blocking mask shown in FIG. 15, the width is largest at the center thereof and minimum at the ends, although the shape may be selected in accordance with the distribution of the non-uniformity of the light intensity.

The present invention is also applicable to a reader which forms an image on a photoelectric conversion image sensor such as a CCD and converts the image to an electrical signal.

A magnification of the focusing optical system in the present invention may be unity or large or smaller than unity.

An object to be imaged by the focusing optical system may be a conventional document sheet or a one-line light emitting diode array which emits lights in accordance with image information. In the latter case, the light source itself contains image information.

In accordance with the present invention, the difference between the peak and the valley in the rippled light intensity distribution on the image produced by the one-line array of the plurality of focusing light transmission media is reduced by a simple construction so that a stripe pattern by the non-uniformity of density in the image is prevented. The non-uniformity of the light intensity due to the light source is also corrected. Thus, the high quality of image can be reproduced with low cost.

What is claimed is:

1. An image exposing apparatus comprising:
  a focusing optical system for focusing an image onto a photosensitive member, said focusing optical system being constructed by one-line array of a plurality of converging light transmission media; and
  light intensity distribution correction means arranged in a light path for forming said image for eliminating a non-uniformity of light intensity on said photosensitive material due to said focusing optical system, said light intensity distribution correction means having a shape to block light fluxes each passing through a center area of each of said converging light transmission media and having a repetitive pattern arranged at a pitch corresponding to a pitch of said converging light transmission media.

2. An image exposing apparatus comprising:
  a focusing optical system for focusing an image onto a photosensitive member, said focusing optical system being constructed by one-line array of a plurality of converging light transmission media; and
  light intensity distribution correction means arranged in a light path for forming said image for eliminating a non-uniformity of light intensity on said photosensitive material due to said focusing optical system, said light intensity distribution correction means including a linear light blocking member.

3. An image exposing apparatus according to claim 2 wherein said linear light blocking member has a varying width along a direction of said array.

4. An image exposing apparatus comprising:
  a document sheet mount table;
  means for illuminating a document sheet;
  a focusing optical system for forming an image of said document sheet and having a one-line array of a plurality of converging light transmission media;
  photosensitive member for sensing the image of said focusing optical system;
  means arranged between said photosensitive member and said table for suppressing an non-uniformity $\Delta I$ of exposure amount on said photosensitive member due to a focusing characteristic of said focusing optical system to less than 1.5%, where $\Delta I = (I\ max - I\ min)/I\ max$, I max is a maximum light intensity on said photosensitive member and I min is a minimum light intensity.

5. An image exposing apparatus according to claim 4 wherein said photosensitive member is a photosensitive drum on which the image of the document sheet is formed.

6. An image exposing apparatus according to claim 4 wherein said photosensitive member is a photoelectric conversion image sensor.

7. An image exposing apparatus comprising:
  a focusing optical system for focusing a light flux bearing image information onto a photosensitive member and having a one-line array of a plurality of converging light transmission media;
  means arranged in a light path for exposing said image for correcting an ununiformity of light intensity on said photosensitive member due to said focusing optical system;
  a degree M of overlapping of images defined by $M = Xo/D$, where D is an effective diameter of said converging light transmission medium and Xo is a radius of view field on said photosensitive member, being selected to a vicinity of 2.75, 3.25 or 3.75.

* * * * *

UNITED STATES PATENT AND TRADEMARK OFFICE
CERTIFICATE OF CORRECTION

PATENT NO. : 4,641,944  Page 1 of 2
DATED : February 10, 1987
INVENTOR(S) : HARUHISA HONDA, ET AL.

It is certified that error appears in the above-identified patent and that said Letters Patent is hereby corrected as shown below:

COLUMN 1

Line 34,  "an" should read --a--.
    Line 44,  "districution" should read --distribution--.
    Line 47,  "aother" should read --another--.

COLUMN 2

Line 1,   "other" should read --another--.
    Line 3,   "other" should read --another--.
    Line 25,  "exist" should read --exit--.
    Line 28,  "plate" should read --plane--.

COLUMN 3

Line 39,  "dogree" should read --degree--.

COLUMN 4

Line 21,  "duble" should read --double--.
    Line 30,  "an" should read --a--.
    Line 51,  "photoconductor" should read --photoconductive--.

UNITED STATES PATENT AND TRADEMARK OFFICE
CERTIFICATE OF CORRECTION

PATENT NO. : 4,641,944

DATED : February 10, 1987

INVENTOR(S) : HARUHISA HONDA, ET AL.

It is certified that error appears in the above-identified patent and that said Letters Patent is hereby corrected as shown below:

COLUMN 6

Line 38, "an" should read --a--.
Line 58, "an ununiformity" should read --a non-uniformity--.

Signed and Sealed this

Twelfth Day of January, 1988

Attest:

DONALD J. QUIGG

Attesting Officer     Commissioner of Patents and Trademarks